United States Patent [19]

Muratomi et al.

[11] Patent Number: 5,057,956
[45] Date of Patent: Oct. 15, 1991

[54] MAGNETIC HEAD HAVING GAP DEPTH SIGHING APERTURE

[75] Inventors: Yoichi Muratomi, Hyogo; Hirofumi Oouchi, Fukushima, both of Japan

[73] Assignee: Mitsubishi Denki Kabushiki Kaisha, Tokyo, Japan

[21] Appl. No.: 407,528

[22] Filed: Sep. 15, 1989

[30] Foreign Application Priority Data

Sep. 19, 1988 [JP] Japan .................................. 63-234090

[51] Int. Cl.⁵ ............................................. G11B 5/187
[52] U.S. Cl. ...................................... 360/122; 360/125
[58] Field of Search ............... 360/122, 125, 126, 127, 360/103

[56] References Cited

U.S. PATENT DOCUMENTS

| | | | |
|---|---|---|---|
| 3,678,211 | 7/1972 | Hoogendorn et al. | 360/103 |
| 3,764,756 | 10/1973 | Murray | 360/129 |
| 4,219,853 | 8/1980 | Albert et al. | 360/103 |

FOREIGN PATENT DOCUMENTS

| | | | |
|---|---|---|---|
| 0057514 | 4/1985 | Japan | 360/122 |
| 0173109 | 11/1985 | Japan . | |
| 0173110 | 11/1985 | Japan . | |
| 0241113 | 10/1987 | Japan | 360/122 |
| 0122913 | 8/1988 | Japan . | |

*Primary Examiner*—David J. Severin
*Attorney, Agent, or Firm*—Wolf, Greenfield & Sacks

[57] ABSTRACT

A magnetic head including a head core having at least one gap and a pair of non-magnetic reinforcing members bonded so as to clamp the head core therebetween. An elongate notch or bore is formed in at least one of the non-magnetic reinforcing members, the notch or bore extending from the gap to the end of the non-magnetic reinforcing member in the direction in which the gap extends, so that the depth of the gap can be directly and optically observed through the notch or bore. It is therefore possible to measure the gap depth easily and accurately in the magnetic head manufacturing process and hence possible to obtain a magnetic head with high accuracy.

29 Claims, 6 Drawing Sheets

MAGNETIC HEAD HAVING GAP DEPTH SIGHING APERTURE

BACKGROUND OF THE INVENTION

1. Field of the Invention

The present invention relates to a magnetic head. More particularly, the present invention pertains to a magnetic head for use in a magnetic disk system.

2. Description of the Prior Art

FIG. 5(a) is a perspective view of a conventional magnetic head used in a magnetic disk system; FIG. 5(b) is an enlarged view of that part of the magnetic head shown in FIG. 5(a) which is encircled by the chain line; and FIG. 6 is a perspective view of the head core shown in FIG. 5(a). Referring to these figures, the reference numeral 10 denotes a head core which comprises a read/write core 11, a center core 12 and an erase core 13. These core members are made of a magnetic material, for example, ferrite. The reference numeral 20 denotes a read/write gap which is defined between the read/write core 11 and the center core 12 which are bonded together by means of glass 40. The read/write gap 20 enables information to be stored onto and regenerated from a magnetic recording medium. The reference numeral 30 denotes an erase gap which is defined between the erase core 13 and the center core 12 which are bonded together by means of glass 41. The erase gap 30 is adapted to provide a predetermined portion carrying no data (known as a "guard band") between adjacent tracks in order to ensure interchangeability of the information recorded on a magnetic recording medium at the read/write gap 20. The reference numerals 50 and 60 denote non-magnetic reinforcing members which sandwich the head core 10 therebetween. The non-magnetic reinforcing members 50 and 60 are made of a ceramic material, for example, calcium titanate or barium titanate. It should be noted that the read/write core 11 and the erase core 13 are, although not illustrated, each provided with a coil for generating electromagnetic force.

The sliding surface [indicated by the hatched lines in FIG. 5(a)] that is defined by the head core 10 and the non-magnetic reinforcing members 50 and 60 so as to come into sliding contact with a magnetic recording medium is formed by lapping the contact surface with high accuracy after the head core 10 and the non-magnetic reinforcing members 50 and 60 have been bonded together.

The dynamic characteristics of a magnetic head are greatly affected not only by the gap accuracy but also by the depth of the gap. In many conventional magnetic heads having the above-described structure, however, the non-magnetic reinforcing members 50 and 60 are opaque and it is therefore impossible to visually observe the depth of the gap and hence impossible to directly know the gap depth when the surface for contact with a magnetic recording medium is being lapped with high accuracy. For this reason, the gap depth has heretofore been controlled by electromagnetically measuring the level of inductance. However, this conventional method needs a complicated measuring process and does not enable direct measurement; therefore, the gap depth cannot be controlled with high accuracy.

To solve this problem, a magnetic head wherein non-magnetic reinforcing members are made of a light-transmitting material, for example, glass, has been proposed (see Japanese Utility Model Public Disclosure (KOKAI) No. 60-173109). However, glass or other light-transmitting material is less effective to serve as reinforcing members, as it wears at a high rate and is readily damaged by dust or the like. If the reinforcing members are damaged, the reliability with respect to a disk as being a magnetic recording medium is deteriorated, which leads to data read errors or other problems. Further, since there is a difference in the wear rate between glass and the ferrite core, the configuration of the magnetic head eventually changes, causing a change in the floating characteristics. As a result, the condition of contact between the head and the disk changes, thus causing signals to be weakened.

SUMMARY OF THE INVENTION

In view of the above-described problems of the prior art, it is a primary object of the present invention to provide a magnetic head which is designed so that it is possible to directly measure the gap depth by use of a microscope or other similar means without impairing the intrinsic functions of the magnetic head and reduce variations in the head characteristics by means of the direct measurement of the gap depth.

To this end, the present invention provides a magnetic head including a head core having at least one gap and a pair of non-magnetic reinforcing members bonded so as to clamp the head core therebetween, wherein the improvement comprises: an elongate notch or bore formed in at least one of the non-magnetic reinforcing members, the notch or bore extending from the gap to the end of the non-magnetic reinforcing member in the direction in which the gap extends, so that the depth of the gap can be observed through the notch or bore.

The notch or bore in the non-magnetic reinforcing member may be filled with a transparent filler. In a notch, an exposed surface of the filler filling the notch is flush with the surface for sliding contact with a magnetic recording medium.

According to the present invention, the gap depth can be directly and visually observed through a notch or bore provided in at least one of the non-magnetic reinforcing members and it is therefore possible to control the gap depth with high accuracy. Since the non-magnetic reinforcing members are formed using a material conventionally employed, for example, a ceramic material, which has high wear resistance and hence causes no change in configuration, there are no problems such as those experienced when glass is employed to form non-magnetic reinforcing members.

In addition, since a notch is filled with a transparent filler so that an exposed surface of the filler is flush with the surface for sliding contact with a magnetic recording medium, it is possible to prevent intrusion and adhesion of dust and avoid damage to the magnetic recording medium by the edges of the notch.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Preferred embodiments of the present invention will be described below in detail with reference to the accompanying drawings.

Figure 1:
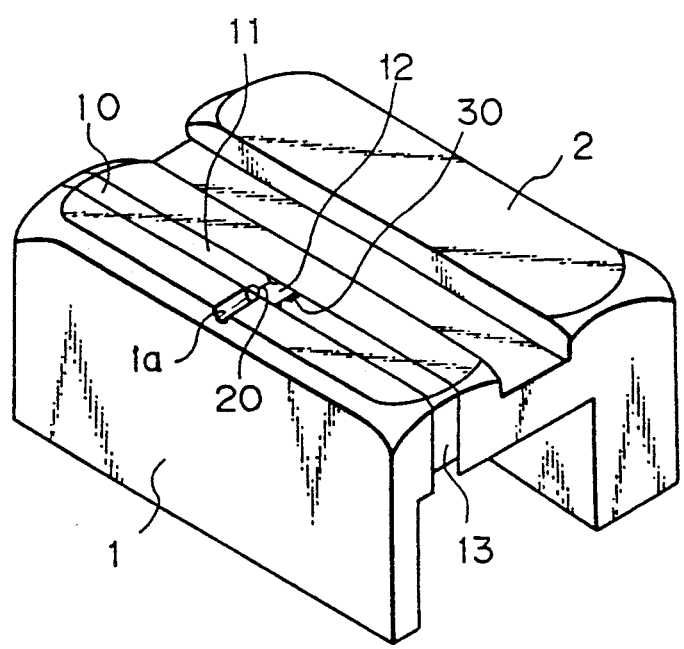
FIG. 1 is a perspective view of one embodiment of the magnetic head according to the present invention.

Referring first to FIG. 1, which is a perspective view of one embodiment of the magnetic head according to the present invention, the reference numeral 10 denotes a head core which comprises a read/write core 11, a center core 12 and an erase core 13. The reference numeral 20 denotes a read/write gap which is defined between the read/write core 11 and the center core 12 which are bonded together by means of glass 40. The reference numeral 30 denotes an erase gap which is defined between the erase core 13 and the center core 12 which are bonded together by means of glass 41. The reference numerals 1 and 2 denote non-magnetic reinforcing members which sandwich the head core 10 therebetween. The non-magnetic reinforcing members 1 and 2 are made of a ceramic material, for example, calcium titanate or barium titanate, in the same way as in the prior art. The non-magnetic reinforcing member 1 has a notch 1a so that the depth of the read/write gap 20 can be directly and visually observed therethrough. The notch 1a has a width which is minimum and adequate to enable observation of the read/write gap 20 and has a depth which is somewhat greater than the sum total of the depth of the read/write gap 20 and the lapping allowance required when the surface for sliding contact with a magnetic recording medium is lapped.

The magnetic head that is formed by bonding together the head core 10 and the non-magnetic reinforcing members 1 and 2 has a surface for sliding contact with a magnetic recording medium. The sliding contact surface can be lapped with high accuracy while the depth of the read/write gap 20 is being accurately measured with an optical device, for example, a microscope, through the notch 1a.

Figure 2A:
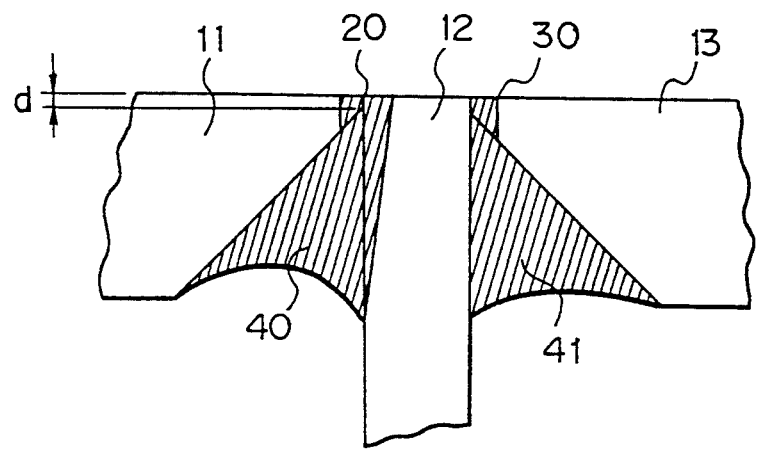
FIG. 2(a) is a side view of the head core shown in FIG. 1.
Figure 2B:
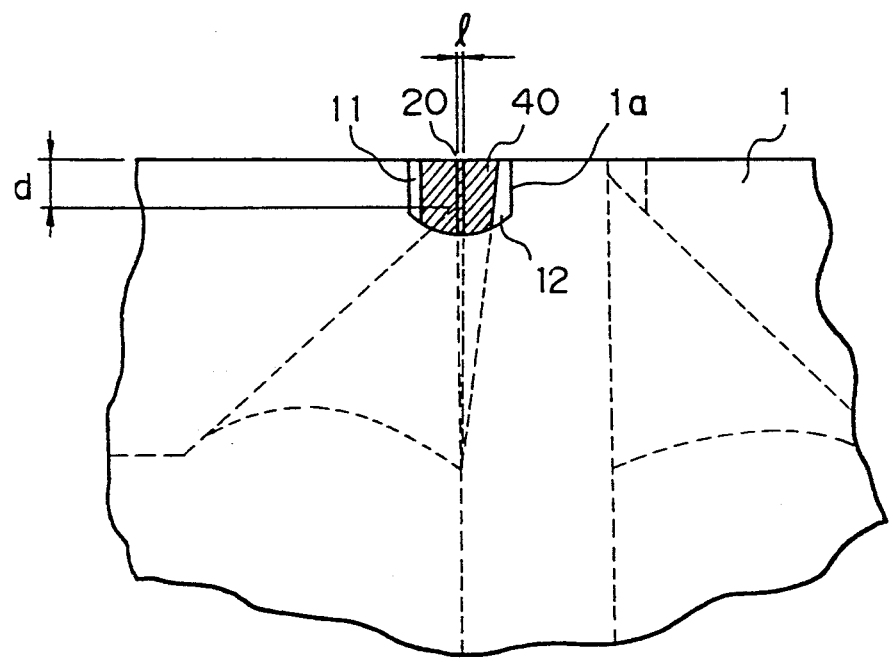
FIG. 2(b) is an enlarged view showing a gap provided in the head core shown in FIG. 1.

FIG. 2(a), which is a side view of the head core 10 shown in FIG. 1, shows the definition of the depth d of the read/write gap 20 through the glass 40. FIG. 2(b) is an enlarged view of the read/write gap 20 as viewed through the notch 1a. The reference symbol l denotes the gap length. If such an image is taken in with a video camera and processed by means of an image processor, the measurement of the gap depth can be effected even more accurately.

Figure 3A:
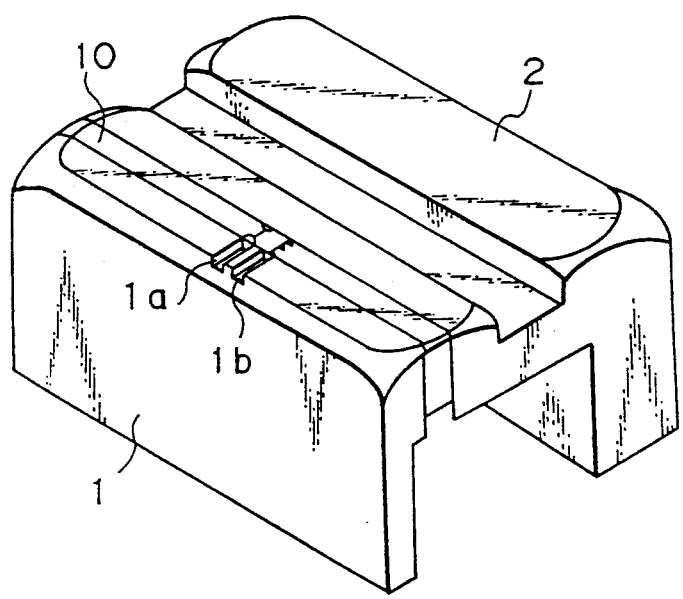
FIGS. 3(a), 3(b) and 4(a), 4(b) are perspective views showing other embodiments, respectively, of the present invention.
Figure 3B:
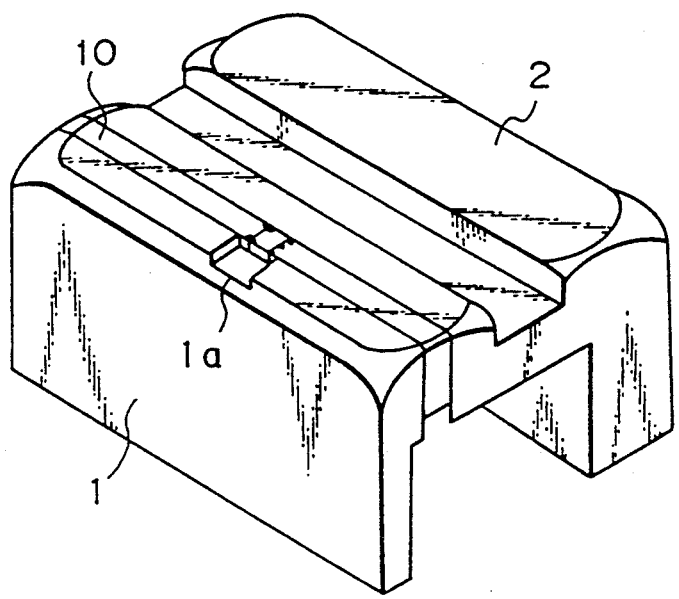

Although in the foregoing embodiment the notch 1a provided in the non-magnetic reinforcing member 1 has a width which is minimum and adequate to enable observation of the read/write gap 20, it is also possible to provide a notch 1b having a width which is minimum and adequate to enable observation of the erase gap 30, as shown in FIG. 3(a). It is also possible to enlarge the width of the notch 1a so that the erase gap 30 can also be observed, as shown in FIG. 3(b).

It is more preferable to fill the notch 1a (1b) with a filler, for example, a wax for head machining, a polymeric material such as an epoxy resin, or glass, so that the surface of the filler filling the notch 1a (1b) is flush with the sliding contact surface, after the sliding contact surface has been lapped until a predetermined gap depth is obtained, thereby preventing intrusion and adhesion of dust and avoiding damage to the magnetic recording medium by the edges of the notch 1a (1b). It is considered that there is no adverse effect of a material filling the notch 1a (1b), which is different from the material constituting the non-magnetic reinforcing member 1, because the area of the notch 1a (1b) is very small.

Figure 4A:
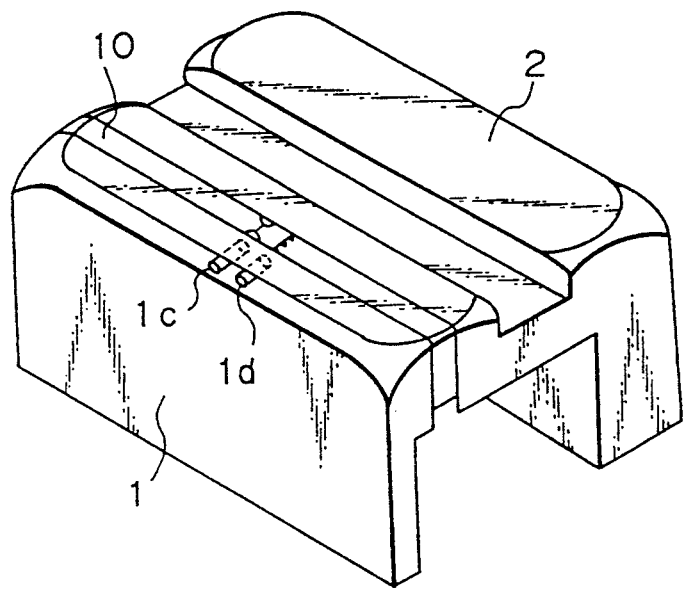
Figure 4B:
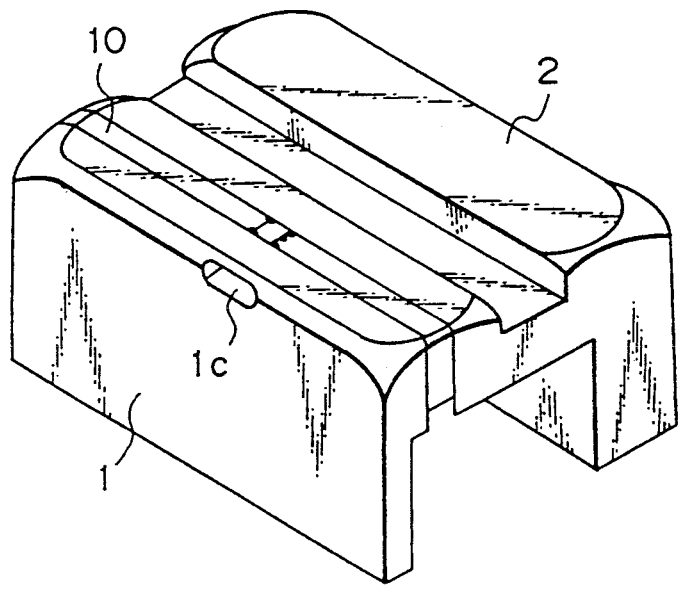
Figure 5A:
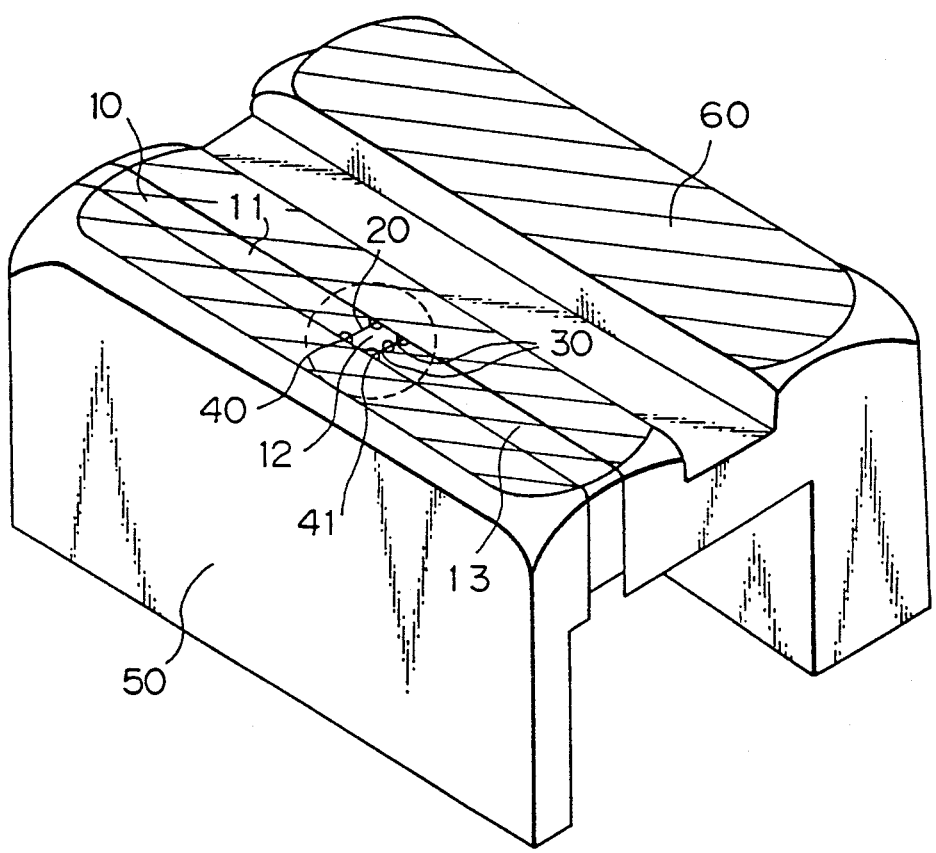
FIG. 5(a) is a perspective view of a conventional magnetic head.
Figure 5B:
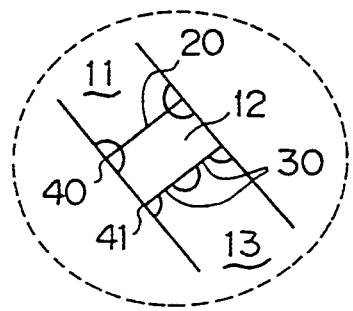
FIG. 5(b) is an enlarged view of that part of the magnetic head shown in FIG. 5(a) which is encircled by the chain line.
Figure 6:
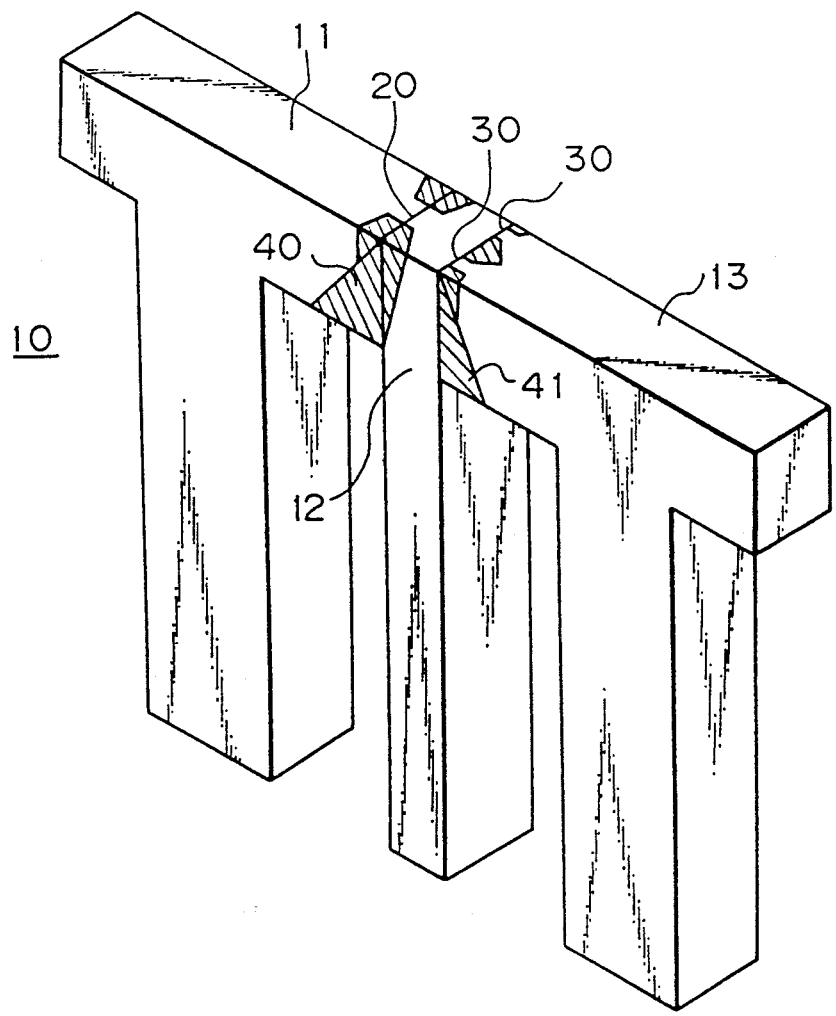
FIG. 6 is a perspective view of the head core shown in FIG. 5(a).

Although in the foregoing embodiments a notch is provided to observe the gap depth, it is also possible to provide a minute bore 1c (1d) in place of the notch 1a (1b), as shown in FIGS. 4(a) and 4(b). In such an alternative arrangement also, the same advantages are obtained.

Since the above-described notch or bore provided in the non-magnetic reinforcing member 1 extends therethrough, and if notches or bores are formed in a stock in the form of a block before it is cut into non-magnetic reinforcing members each having a predetermined width, it is possible to produce non-magnetic reinforcing members more easily than in the case where a notch or bore is individually formed in each non-magnetic reinforcing member after it has been cut from a block.

As has been described above, the present invention provides a magnetic head including a head core having at least one gap and a pair of non-magnetic reinforcing members bonded so as to clamp the head core therebetween, wherein an elongated notch or bore is formed in at least one of the non-magnetic reinforcing members, the notch or bore extending from the gap to the end of the non-magnetic reinforcing member in the direction in which the gap extends, so that the depth of the gap can be directly and optically observed through the notch or bore. It is therefore possible to measure the gap depth easily and accurately in the magnetic head manufacturing process and hence possible to obtain a magnetic head with high accuracy.

In addition, since the notch or bore is filled with a transparent filler so that the surface of the filler filling the notch or bore is flush with the surface for sliding contact with a magnetic recording medium, it is possible to prevent intrusion and adhesion of dust and avoid damage to the magnetic recording medium by the edges of the notch.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A magnetic head having a sliding surface for contact with a magnetic recording medium, and including a head core having at least one gap and a pair of non-magnetic reinforcing members bonded so as to clamp said head core therebetween, wherein the improvement comprises:

a notch formed in at least one of said non-magnetic reinforcing members, said notch extending from said gap to an end of said non-magnetic reinforcing member in the direction in which said gap extends, so that the depth of said gap can be observed through said notch.

2. A magnetic head according to claim 1, wherein said non-magnetic reinforcing members are made of a ceramic material, for example, calcium titanate or barium titanate.

3. A magnetic head according to claim 1 wherein said notch is elongated.

4. A magnetic head according to claim 1, wherein said notch is filled with a transparent filler so that an exposed surface of said filler filling said notch is flush with the surface for sliding contact with a magnetic recording medium.

5. A magnetic head according to claim 4 wherein said filler is a wax.

6. A magnetic head according to claim 4, wherein said filler is a polymeric material, for example, an epoxy resin.

7. A magnetic head according to claim 4, wherein said filler is glass.

8. In a magnetic head having a sliding surface for contact with a magnetic recording medium, a head core with at least one gap formed therein, and a pair of non-magnetic reinforcing members bonded so as to clamp said head core therebetween, the improvement comprising, means defining a notch formed in at least one of said non-magnetic reinforcing members, said notch extending from said gap to an end of said non-magnetic reinforcing member at which the depth of said gap can be observed through said notch.

9. In a magnetic head according to claim 8, wherein said non-magnetic reinforcing members are made of a ceramic material, for example, calcium titanate or barium titanate.

10. A magnetic head as set forth in claim 8 wherein said notch is elongated.

11. A magnetic head according to claim 6, wherein said notch is filled with a transparent filler so that an exposed surface of said filler filling said notch or bore is flush with the surface for sliding contact with a magnetic recording medium.

12. A magnetic head according to claim 11, wherein said filler is a wax.

13. A magnetic head according to claim 11 wherein said filler is a polymeric material, for example, an epoxy resin.

14. A magnetic head according to claim 11 wherein said filler is glass.

15. A magnetic head having a sliding surface for contact with a magnetic recording medium, and including a head core having at least one gap and a pair of non-magnetic reinforcing members bonded so as to clamp said head core therebetween, wherein the improvement comprises: a bore formed in at least one of said non-magnetic reinforcing members, said bore extending from said gap to the end of said non-magnetic reinforcing member in the direction in which said gap extends, so that the depth of said gap can be observed through said bore.

16. A magnetic head according to claim 15, wherein said non-magnetic reinforcing members are made of a ceramic material, for example, calcium titanate or barium titanate.

17. A magnetic head as set forth in claim 15 wherein said bore is elongated.

18. A magnetic head according to claim 15, wherein said bore is filled with a transparent filler.

19. A magnetic head according to claim 18, wherein said filler is a wax.

20. A magnetic head according to claim 18, wherein said filler is a polymeric material, for example, an epoxy resin.

21. A magnetic head according to claim 18, wherein said filler is glass.

22. In a magnetic head having a sliding surface for contact with a magnetic recording medium, a head core with at least one gap formed therein, and a pair of non-magnetic reinforcing members bonded so as to clamp said head core therebetween, the improvement comprising, means defining a bore formed in at least one of said non-magnetic reinforcing members, said bore extending from said gap to an end of said non-magnetic reinforcing member at which the depth of said gap can be observed through said bore.

23. A magnetic head according to claim 22, wherein said non-magnetic reinforcing members are made of a ceramic material, for example, clacium titanate or barium titanate.

24. A magnetic head according to claim 22 wherein said bore is elongated.

25. A magnetic head according to claim 22, wherein said bore is filled with a transparent filler.

26. A magnetic head according to claim 25, wherein said filler is a wax.

27. A magnetic head according to claim 25 wherein said filler is a polymeric material, for example, an epoxy resin.

28. A magnetic head according to claim 25 wherein said filler is glass.

29. A magnetic head for use with a magnetic recording medium and having a sliding surface for contact with said magnetic recording medium, said magnetic head comprising:
a head core having edges defining at least one gap;
two non-magnetic reinforcing members bonded to said head core so as to clamp said head core therebetween;
at least one of said non-magnetic reinforcing members having a visually unobstructed passage means to observe the depth of said gap, said means extends from said gap to an end of said non-magnetic reinforcing member, in a direction substantially parallel to said edges defining said gap.

* * * * *